United States Patent
Mital et al.

(10) Patent No.: US 8,874,878 B2
(45) Date of Patent: Oct. 28, 2014

(54) THREAD SYNCHRONIZATION IN A MULTI-THREAD, MULTI-FLOW NETWORK COMMUNICATIONS PROCESSOR ARCHITECTURE

(71) Applicant: LSI Corporation, Milpitas, CA (US)

(72) Inventors: Deepak Mital, Orefield, PA (US); James Clee, Orefield, PA (US); Jerry Pirog, Easton, PA (US)

(73) Assignee: LSI Corporation, Milpitas, CA (US)

( * ) Notice: Subject to any disclaimer, the term of this patent is extended or adjusted under 35 U.S.C. 154(b) by 161 days.

(21) Appl. No.: 13/687,719

(22) Filed: Nov. 28, 2012

(65) Prior Publication Data

US 2013/0089109 A1    Apr. 11, 2013

Related U.S. Application Data

(63) Continuation-in-part of application No. 12/782,379, filed on May 18, 2010, and a continuation-in-part of application No. 12/782,393, filed on May 18, 2010, now Pat. No. 8,255,644, and a continuation-in-part of application No. 12/782,411, filed on May 18, 2010, now Pat. No. 8,407,707.

(60) Provisional application No. 61/564,811, filed on Nov. 29, 2011.

(51) Int. Cl.
| | |
|---|---|
| *G06F 15/00* | (2006.01) |
| *G06F 15/76* | (2006.01) |
| *H04L 29/06* | (2006.01) |
| *H04L 12/851* | (2013.01) |

(52) U.S. Cl.
CPC ............ *H04L 69/22* (2013.01); *H04L 47/2441* (2013.01)
USPC ................................................ 712/30; 712/16

(58) Field of Classification Search
None
See application file for complete search history.

(56) References Cited

U.S. PATENT DOCUMENTS

| | | | |
|---|---|---|---|
| 4,123,795 A | 10/1978 | Dean, Jr. et al. | |
| 4,622,631 A | 11/1986 | Frank et al. | |

(Continued)

FOREIGN PATENT DOCUMENTS

JP    H02-271444    11/1990

OTHER PUBLICATIONS

Alan H. Karp and Rajiv Gupta, "Hardware Assist for Data Merging for Shared Memory Multiprocessors", Hewlett-Packard Labs, Palo Alto, CA, Mar. 13, 1994.

(Continued)

*Primary Examiner* — Corey S Faherty
(74) *Attorney, Agent, or Firm* — Daniel J. Santos; Smith Risley Tempel Santos LLC

(57) ABSTRACT

Described embodiments provide a packet classifier for a network processor that generates tasks corresponding to each received packet. The packet classifier includes a scheduler to generate contexts corresponding to tasks received by the packet classifier from processing modules of the network processor. The packet classifier processes threads of instructions, each thread of instructions corresponding to a context received from the scheduler, and each thread associated with a data flow. A thread status table has N entries to track up to N active threads. Each status entry includes a valid status indicator, a sequence value, a thread indicator and a flow indicator. A sequence counter generates a sequence value for each data flow of each thread and is incremented when processing of a thread is started, and is decremented when a thread is completed. Instructions are processed in the order in which the threads were started for each data flow.

20 Claims, 5 Drawing Sheets

(56) References Cited

U.S. PATENT DOCUMENTS

| | | | |
|---|---|---|---|
| 5,394,534 A | 2/1995 | Kulakowski et al. | |
| 5,623,698 A | 4/1997 | Stephenson et al. | |
| 5,838,931 A | 11/1998 | Regenold et al. | |
| 5,892,766 A | 4/1999 | Wicki et al. | |
| 5,893,120 A | 4/1999 | Nemes | |
| 5,909,695 A | 6/1999 | Wong et al. | |
| 5,943,283 A | 8/1999 | Wong et al. | |
| 5,974,421 A | 10/1999 | Krishnaswamy et al. | |
| 6,026,467 A | 2/2000 | Petty | |
| 6,038,630 A | 3/2000 | Foster et al. | |
| 6,052,697 A | 4/2000 | Bennett et al. | |
| 6,115,802 A | 9/2000 | Tock et al. | |
| 6,195,335 B1 | 2/2001 | Calvignac et al. | |
| 6,216,167 B1 | 4/2001 | Momirov | |
| 6,233,246 B1 | 5/2001 | Hareski et al. | |
| 6,289,013 B1 | 9/2001 | Lakshman et al. | |
| 6,341,130 B1 | 1/2002 | Lakshman et al. | |
| 6,567,564 B1 | 5/2003 | van der Wal | |
| 6,584,546 B2 | 6/2003 | Kavipurapu | |
| 6,636,932 B1 | 10/2003 | Regev et al. | |
| 6,658,012 B1 | 12/2003 | Baucom, Jr. et al. | |
| 6,839,830 B2 | 1/2005 | Liu | |
| 6,907,469 B1 | 6/2005 | Gallo et al. | |
| 6,914,882 B2 | 7/2005 | Merani et al. | |
| 7,058,057 B2 | 6/2006 | Dooley et al. | |
| 7,085,911 B2 | 8/2006 | Sachedina et al. | |
| 7,089,346 B2 | 8/2006 | Cebulla et al. | |
| 7,159,219 B2 | 1/2007 | Chen et al. | |
| 7,234,018 B1 | 6/2007 | Purcell et al. | |
| 7,287,046 B2 | 10/2007 | Bulka et al. | |
| 7,397,809 B2 | 7/2008 | Wang | |
| 7,453,898 B1 | 11/2008 | Cohen et al. | |
| 7,461,208 B1 | 12/2008 | Caprioli et al. | |
| 7,461,407 B2 | 12/2008 | Little et al. | |
| 7,512,740 B2 | 3/2009 | Diefendorff | |
| 7,519,065 B2 | 4/2009 | Angle et al. | |
| 7,554,464 B1 | 6/2009 | Oberdorfer | |
| 7,594,028 B1 | 9/2009 | Jacobs et al. | |
| 7,596,142 B1 | 9/2009 | MacAdam | |
| 7,600,078 B1 | 10/2009 | Cen et al. | |
| 7,659,894 B2 | 2/2010 | Keller et al. | |
| 7,660,259 B1 | 2/2010 | Grosser et al. | |
| 7,710,988 B1 | 5/2010 | Tripathi et al. | |
| 7,720,055 B2 | 5/2010 | Kadambi et al. | |
| 7,826,434 B2 * | 11/2010 | Goldrian et al. | 370/338 |
| 7,849,315 B2 | 12/2010 | Hardy et al. | |
| 7,886,150 B2 | 2/2011 | Stollon et al. | |
| 8,127,350 B2 | 2/2012 | Wei et al. | |
| 8,140,759 B2 | 3/2012 | Frey et al. | |
| 8,473,657 B2 * | 6/2013 | Zhou et al. | 710/111 |
| 2002/0029214 A1 | 3/2002 | Yianilos et al. | |
| 2002/0165985 A1 | 11/2002 | Chen et al. | |
| 2003/0033276 A1 | 2/2003 | Cheng et al. | |
| 2003/0041163 A1 * | 2/2003 | Rhoades et al. | 709/232 |
| 2003/0115417 A1 | 6/2003 | Corrigan | |
| 2003/0123468 A1 | 7/2003 | Nong | |
| 2004/0255209 A1 | 12/2004 | Gross | |
| 2005/0027920 A1 | 2/2005 | Fitzsimmons et al. | |
| 2005/0141537 A1 | 6/2005 | Kumar et al. | |
| 2005/0152352 A1 | 7/2005 | Jun et al. | |
| 2006/0029079 A1 | 2/2006 | Cohen et al. | |
| 2006/0126628 A1 * | 6/2006 | Li et al. | 370/392 |
| 2006/0256783 A1 | 11/2006 | Ayrapetian et al. | |
| 2007/0011396 A1 | 1/2007 | Singh et al. | |
| 2007/0016756 A1 | 1/2007 | Hsieh et al. | |
| 2007/0043856 A1 | 2/2007 | Morris et al. | |
| 2007/0189283 A1 * | 8/2007 | Agarwal et al. | 370/388 |
| 2007/0226798 A1 | 9/2007 | Sibert | |
| 2007/0271374 A1 | 11/2007 | Shomura et al. | |
| 2008/0077928 A1 | 3/2008 | Matsuzaki et al. | |
| 2008/0092092 A1 | 4/2008 | Dalton et al. | |
| 2008/0162793 A1 | 7/2008 | Chu et al. | |
| 2008/0239992 A1 | 10/2008 | Krasnyanskiy | |
| 2008/0240103 A1 | 10/2008 | Schmidt | |
| 2008/0240106 A1 | 10/2008 | Schlenk | |
| 2009/0019270 A1 | 1/2009 | Halter et al. | |
| 2009/0271562 A1 | 10/2009 | Sinclair | |
| 2010/0260198 A1 | 10/2010 | Rojas-Cessa et al. | |
| 2011/0219195 A1 | 9/2011 | Habusha et al. | |

OTHER PUBLICATIONS

Sundaram, Chandra, Goyal, Shenoy, Sahni, Vin. "Application Performance in the QLinux Multimedia Operating System", ACM Multimedia, Los Angeles, CA (2000).

Lu, Sheng, Dinda. "Size-based Scheduling Policies with Inaccurate Scheduling Information", Proceedings of the IEEE Computer Society's 12th Annual International Symposium on Modeling, Analysis, and Simulation of Computer and Telecommunications Systems (2004).

Schurgers, Raghunathan, Srivastava. "Modulation Scaling for Realtime Energy Aware Packet Scheduling", IEEE, Nov. 2001.

Chiueh et al., "High-Performance IP Routing Table Lookup Using CPU Caching", IEEE (1999).

* cited by examiner

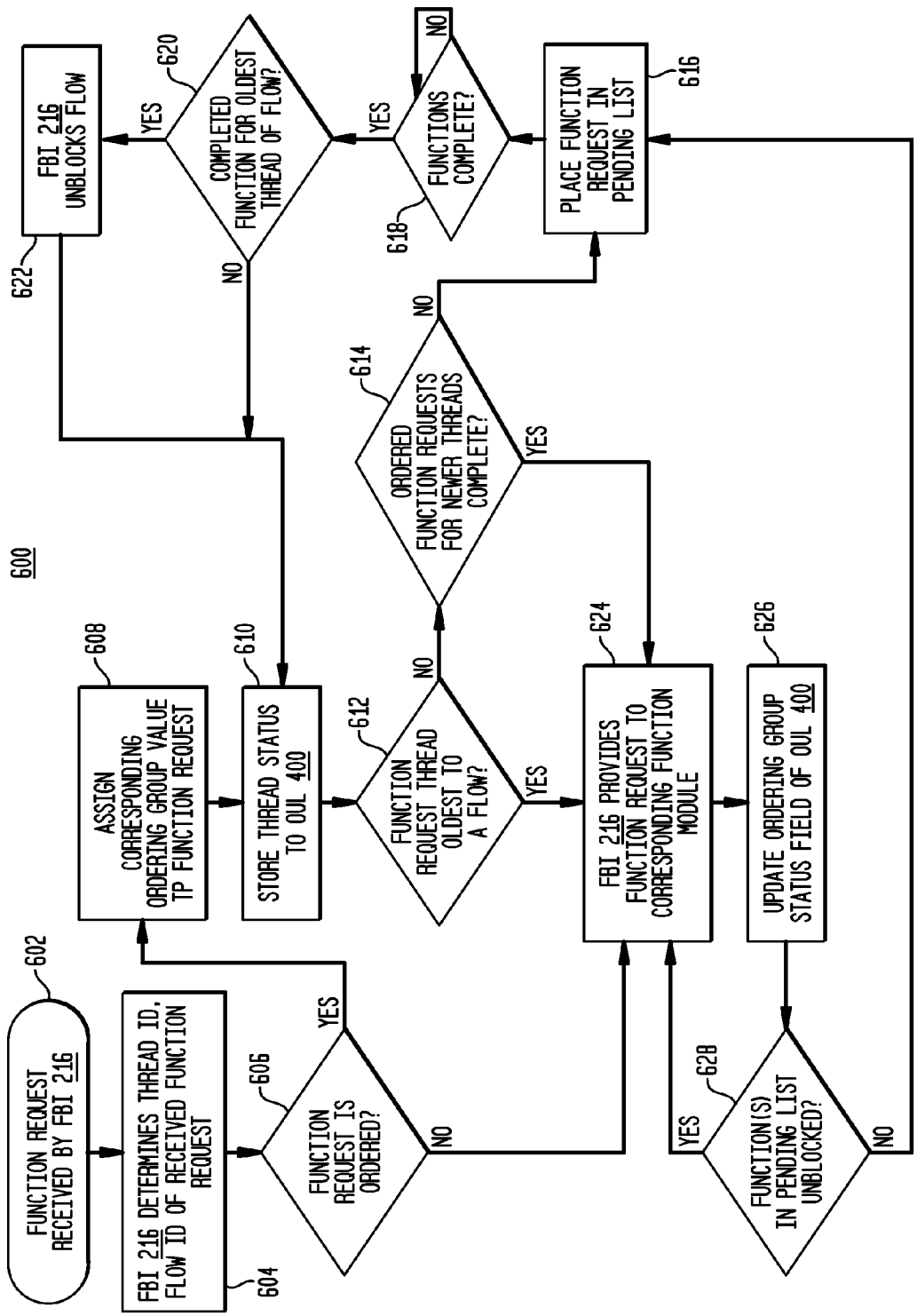

THREAD SYNCHRONIZATION IN A MULTI-THREAD, MULTI-FLOW NETWORK COMMUNICATIONS PROCESSOR ARCHITECTURE

CROSS-REFERENCE TO RELATED APPLICATIONS

This application claims the benefit of the filing date of U.S. provisional application No. 61/564,811 filed Nov. 29, 2011, the teachings of which are incorporated herein in their entireties by reference.

This application is a continuation-in-part, and claims the benefit of the filing date, of U.S. patent application Ser. No. 12/782,379 filed May 18, 2010, Ser. No. 12/782,393 filed May 18, 2010, now issued as U.S. Pat. No. 8,255,644, and Ser. No. 12/782,411 filed May 18, 2010, now issued as U.S. Pat. No. 8,407,707, the teachings of which are incorporated herein in their entireties by reference.

The subject matter of this application is related to U.S. patent application Ser. No. 12/430,438 filed Apr. 27, 2009, now issued as U.S. Pat. No. 8,352,669, Ser. No. 12/729,226 filed Mar. 22, 2010, Ser. No. 12/729,231 filed Mar. 22, 2010, now issued as U.S. Pat. No. 8,473,657, Ser. No. 12/963,895 filed Dec. 9, 2010, now issued as U.S. Pat. No. 8,499,137, Ser. No. 12/971,742 filed Dec. 17, 2010, Ser. No. 12/974,477 filed Dec. 21, 2010, Ser. No. 12/975,823 filed Dec. 22, 2010, now issued as U.S. Pat. No. 8,505,013, Ser. No. 12/975,880 filed Dec. 22, 2010, now issued as U.S. Pat. No. 8,514,874, Ser. No. 12/976,045 filed Dec. 22, 2010, Ser. No. 12/976,228 filed Dec. 22, 2010, Ser. No. 12/979,551 filed Dec. 28, 2010, now issued as U.S. Pat. No. 8,489,791, Ser. No. 12/979,665 filed Dec. 28, 2010, now issued as U.S. Pat. No. 8,489,792, Ser. No. 12/979,800 filed Dec. 28, 2010, now issued as U.S. Pat. No. 8,489,794, Ser. No. 13/046,717 filed Mar. 12, 2011, Ser. No. 13/046,719 filed Mar. 12, 2011 now issued as U.S. Pat. No. 8,321,385, Ser. No. 13/046,726 filed Mar. 12, 2011, Ser. No. 13/192,104 filed Jul. 27, 2011, Ser. No. 13/192,140 filed Jul. 27, 2011, Ser. No. 13/192,187 filed Jul. 27, 2011, Ser. No. 13/232,422 filed Sep. 14, 2011, Ser. No. 13/250,898 filed Sep. 30, 2011, Ser. No. 13/274,726 filed Oct. 17, 2011, Ser. No. 13/310,961 filed Dec. 5, 2011, Ser. No. 13/316,145 filed Dec. 9, 2011, Ser. No. 13/359,690 filed Jan. 27, 2012, Ser. No. 13/405,053 filed Feb. 23, 2012, Ser. No. 13/403,468 filed Feb. 23, 2012, Ser. No. 13/409,432 filed Mar. 1, 2012, Ser. No. 13/474,114 filed May 17, 2012, Ser. No. 13/480,623 filed May 25, 2012, Ser. No. 13/568,365 filed Aug. 7, 2012, Ser. No. 13/687,772 filed Nov. 28, 2012, Ser. No. 13/687,865 filed Nov. 28, 2012, Ser. No. 13/687,911 filed Nov. 28, 2012, Ser. No. 13/687,958 filed Nov. 28, 2012, and Ser. No. 13/687,971 filed Nov. 28, 2012, the teachings of all of which are incorporated herein in their entireties by reference.

BACKGROUND

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors had diminishing performance improvements, or might actually slow down overall network processor throughput. Newer designs add hardware accelerators in a system on chip (SoC) architecture to offload certain tasks from the general-purpose processors, such as encryption/decryption, packet data inspections, and the like. These newer network processor designs are traditionally implemented with either i) a non-pipelined SoC architecture or ii) a fixed pipeline SoC architecture.

In a typical non-pipelined SoC architecture, general-purpose processors are responsible for each action taken by acceleration functions. A non-pipelined SoC architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline SoC architecture, packet data flows through the general-purpose processors and/or accelerators in a fixed sequence regardless of whether a particular processor or accelerator is required to process a given packet. For example, in a fixed sequence, a single accelerator within the fixed pipeline cannot be employed without employing the entire fixed pipeline. This fixed sequence might add significant overhead to packet processing and has limited flexibility to handle new protocols, limiting the advantage provided by using the accelerators.

Network processors implemented as an SoC having multiple processing modules might typically employ one or more hardware accelerators to implement well defined procedures to improve the efficiency and performance of the SoC. Further, overall throughput to storage devices, particularly memories external to the SoC, might be performance bottlenecks for the SoC. For example, an external memory might include two or more substructures (e.g., multiple banks of DRAM). In such a system, a latency penalty might be incurred for sequential read requests to the same memory substructure. Additionally, a given set of operations for a data flow might be required to be completed in a given order. Thus, an improved system for avoiding head-of-line blocking for data flow operations is needed.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a packet classifier for a network processor that generates tasks corresponding to each received packet. The packet classifier includes a scheduler to generate contexts corresponding to tasks received by the packet classifier from a plurality of processing modules of the network processor. The packet classifier processes threads of instructions, each thread of instructions corresponding to a context received from the scheduler, and each thread associated with a data flow. A thread status table has N entries to track up to N active threads. Each status entry includes a valid status indicator, a sequence value, a thread indicator and a flow indicator. A sequence counter generates a sequence value for each data flow of each thread and is incremented when processing of a thread is started, and is decremented when a thread is completed. Instructions are processed in the order in which the threads were started for each data flow.

BRIEF DESCRIPTION OF THE DRAWING FIGURES

Other aspects, features, and advantages of described embodiments will become more fully apparent from the following detailed description, the appended claims, and the accompanying drawings in which like reference numerals identify similar or identical elements.

FIG. 6 shows a flow diagram of a function scheduling process employed by a function manager of the packet processor of FIG. 2 in accordance with exemplary embodiments.

DETAILED DESCRIPTION

Described embodiments provide a packet classifier for a network processor that generates tasks corresponding to each received packet. The packet classifier includes a scheduler to generate contexts corresponding to tasks received by the packet classifier from a plurality of processing modules of the network processor. The packet classifier processes threads of instructions, each thread of instructions corresponding to a context received from the scheduler, and each thread associated with a data flow. A thread status table has N entries to track up to N active threads. Each status entry includes a valid status indicator, a sequence value, a thread indicator and a flow indicator. A sequence counter generates a sequence value for each data flow of each thread and is incremented when processing of a thread is started, and is decremented when a thread is completed. Instructions are processed in the order in which the threads were started for each data flow.

Table 1 defines a list of acronyms employed throughout this specification as an aid to understanding the described embodiments:

TABLE 1

| | |
|---|---|
| USB | Universal Serial Bus |
| SATA | Serial Advanced Technology Attachment |
| SCSI | Small Computer System Interface |
| SAS | Serial Attached SCSI |
| PCI-E | Peripheral Component Interconnect Express |
| SoC | System-on-Chip |
| AXI | Advanced eXtensible Interface |
| AMBA | Advanced Microcontroller Bus Architecture |
| PAB | Packet Assembly Block |
| MTM | Modular Traffic Manager |
| DBC | Data Buffer Controller |
| HE | Hash Engine |
| SENG | State Engine |
| TID | Task Identifier |
| OUL | Oldest Unspecified List |
| SCH | Scheduler |
| SPP | Security Protocol Processor |
| TIL | Task Input Logic |
| TCP | Transmission Control Protocol |

TABLE 1-continued

| | |
|---|---|
| IP | Internet Protocol |
| FIFO | First-In, First-Out |
| I/O | Input/Output |
| DDR | Double Data Rate |
| DRAM | Dynamic Random Access Memory |
| MMB | Memory Manager Block |
| μP | Microprocessor |
| PLB | Processor Local Bus |
| MPP | Modular Packet Processor |
| AAL5 | ATM Adaptation Layer 5 |
| SED | Stream Editor |
| TID | Thread Identifier |
| PQM | Pre-Queue Modifier |
| FBI | Function Bus Interface |
| CCL | Classification Completion List |
| OC | Ordered Call |
| SEM | Semaphore Engine |
| PCM | Per Context Memory |
| PDU | Protocol Data Unit |
| PIC | Packet Integrity Checker |
| CRC | Cyclic Redundancy Check |

Figure 1:
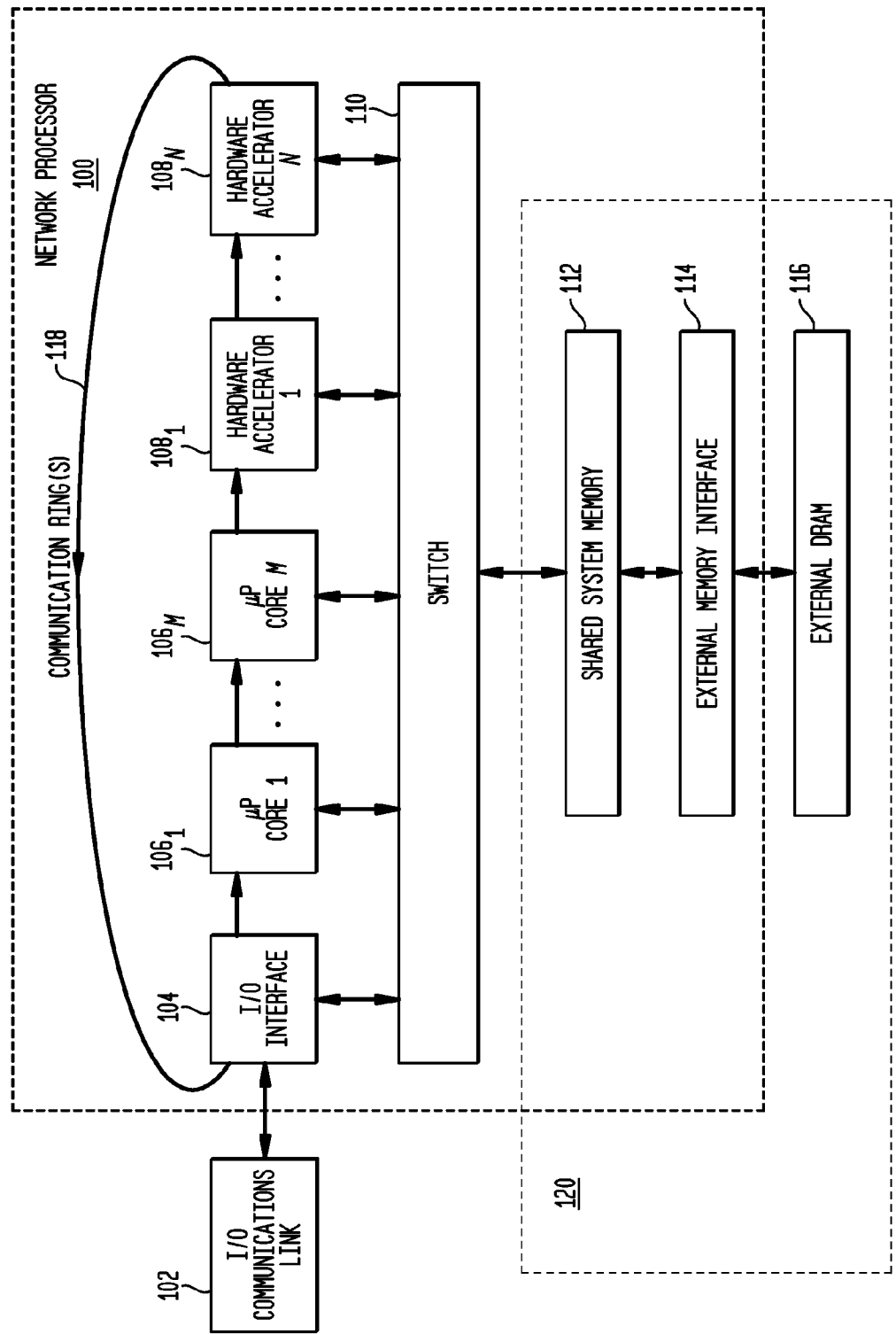
FIG. 1 shows a block diagram of a network processor operating in accordance with exemplary embodiments.

FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (μP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, μP cores and hardware accelerators might be coupled through switch 110 to shared memory 112. Switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In described embodiments, shared memory 112 is a conventional memory operating as a cache that might be allocated and/or subdivided. For example, shared memory 112 might include one or more FIFO queues that might be dynamically allocated to the various μP cores 106 and hardware accelerators 108. External memory interface 114 couples shared memory 112 to one or more external memories, shown as external memory 116, to provide off-chip storage of data not currently in use by the various μP cores 106 and hardware accelerators 108 to free space in shared memory 112. As indicated by the dashed line, shared memory 112 and external memory 116 might generally be referred to as system memory 120. In general, system memory 120 might be addressed as a single address space such that various accelerators 108 can seamlessly request data whether the data is stored in shared memory 112 or external memory 116.

Hardware accelerators 108 might interact with each other, for example, by one or more communication bus rings 118 that pass "tasks" from a source core to a destination core. Tasks allow network processor 100 to process a wide variety of data and control messages more efficiently than with a fixed pipeline or non-pipelined architecture. As discussed in more detail below, the sequence of processing of the tasks depends on i) the type of packet and ii) the type of processing performed by the various cores on a particular packet (or group of packets), control message, or other data. This is referred to herein as a "Virtual Pipeline™", a trademark of LSI Corporation, of Milpitas, Calif. In some embodiments, each of a plurality of virtual pipelines operate by each processing module of network processor 100 receiving a task, executing that task, and assigning a subsequent task to another (or the same) processing module depending on an identification of a virtual pipeline corresponding to the task. As described herein, tasks are instructions to the destination core to perform certain functions, and a task might be passed substantially as described in related U.S. patent application Ser. Nos. 12/782,379, 12/782,393, and 12/782,411 all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112.

I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted out of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various μP cores 106 and hardware accelerators 108 of network processor 100 might include several exemplary types of processors or accelerators. For example, the various μP cores 106 might be implemented as Pentium®, Power PC® or ARM processors or a combination of different processor types (Pentium® is a registered trademark of Intel Corporation, ARM processors are by ARM Holdings, plc, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SDWRR) for every queue and scheduler. The MTM might also support multicasting. Each copy of a packet is scheduled independently and traverses down one or more virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions. The MTM might operate substantially as described in related U.S. patent application Ser. No. 13/232,422, filed Sep. 14, 2011 and Ser. No. 13/250, 898 filed Sep. 30, 2011, which are incorporated by reference herein.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is a multi-threaded accelerator. An exemplary RegEx engine might be implemented such as described in U.S. Pat. No. 7,430,652 to Hundley, U.S. Pat. No. 7,899,904 to Ruehle and U.S. Pat. No. 7,512,592 to Lemoine, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache thrashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010 and Ser. No. 13/359,690 filed Jan. 27, 2012, the teachings of which are incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, and Ser. No. 13/405,053 filed Feb. 23, 2012, the teachings of which are incorporated by reference herein.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010 and Ser. No. 13/474,114 filed May 17, 2012, the teachings of which are incorporated by reference herein. The MPP might also include hash functionality such as described in related U.S. patent application Ser. Nos. 13/046,717, 13/046,719, and 13/046,726 all filed Mar. 12, 2011, Ser. No. 13/403,468 filed Feb. 23, 2012 and Ser. No. 13/474,114 filed May 17, 2012, the teachings of which are incorporated by reference herein.

Figure 2:
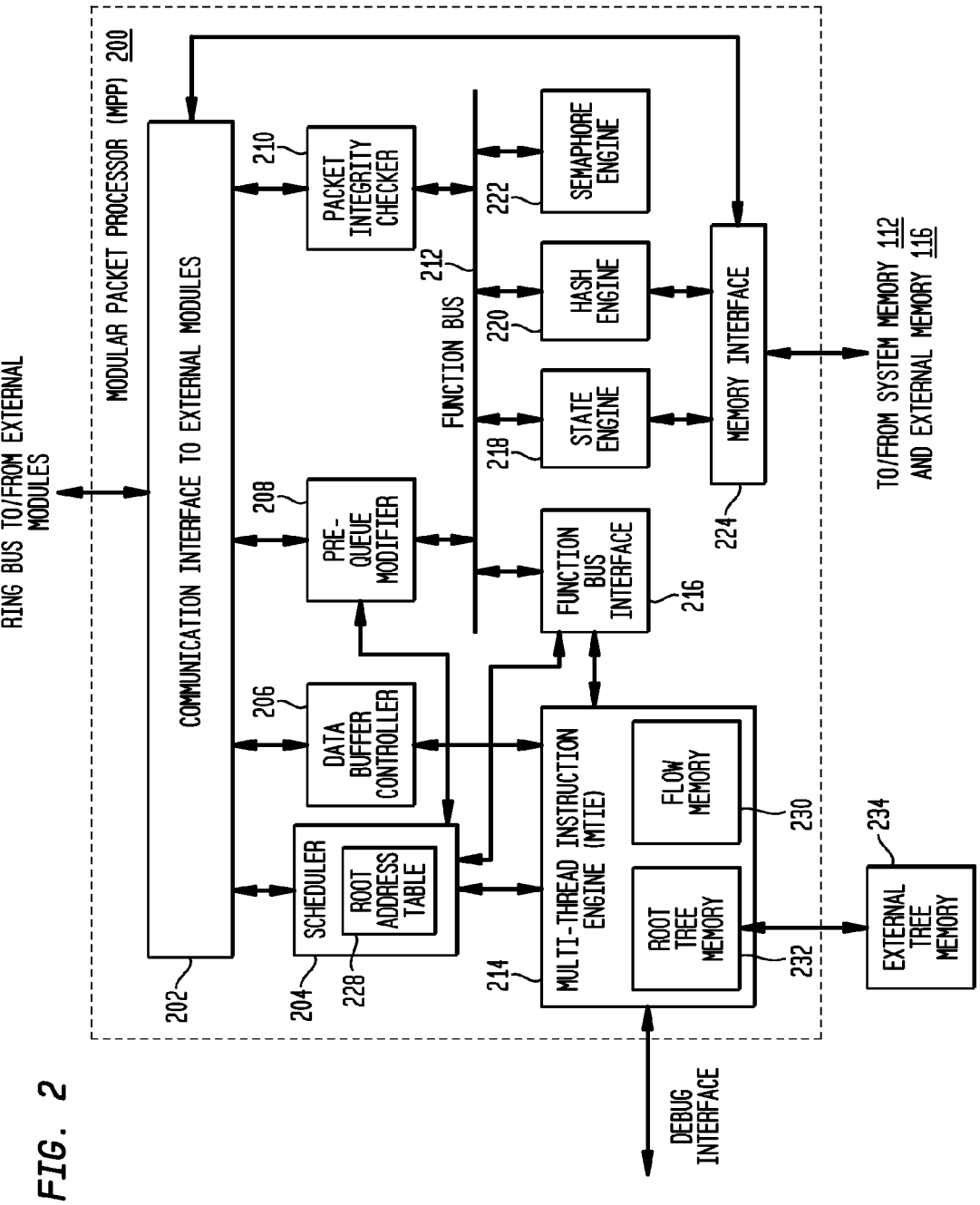
FIG. 2 shows a block diagram of a modular packet processor submodule of the network processor of FIG. 1 in accordance with exemplary embodiments.

FIG. 2 shows a block diagram of an exemplary MPP 200, in accordance with described embodiments. MPP 200 might receive an input task from any μP core or accelerator (e.g., μP cores 106 or accelerators 108) of network processor 100. MPP 200 performs operations specified by the input task on a data packet stored in at least one of shared memory 112 and external memory 116. When MPP 200 is finished operating on the data packet, MPP 200 might generate an output task to another μP core or accelerator of network processor 100, for example, a next μP core or accelerator specified for a given virtual flow identifier.

As described herein, MPP 200 might generally be employed as a packet classification engine in network processor 100. In general, packet classification categorizes packets into classes, for example, based on port number or protocol. Each resulting packet class might be treated differently to control packet flow, for example, each packet class might be subject to a different rate limit or prioritized differently relative to other packet classes. Classification is achieved by various means. Matching bit patterns of data to those of known protocols is a simple, yet widely-used technique. More advanced traffic classification techniques rely on statistical analysis of attributes such as byte frequencies, packet sizes and packet inter-arrival times. Upon classifying a traffic flow using a particular protocol, a predetermined policy can be applied to it and other flows to either guarantee a certain quality (as with VoIP or media streaming service) or to provide best-effort delivery.

As shown in FIG. 2, and as will be described, packet classification might be performed by Multi-thread Instruction Engine (MTIE) 214 of MPP 200. Packet (also Protocol Data Unit or PDU) data modification might be carried out by Pre-Queue Modifier (PQM) 208. A packet integrity check might typically be carried out by Packet Integrity Checker (PIC) 210, such as determining that a packet is properly formed according to a given protocol. PIC 210 might, for example, implement various CRC and checksum functions of MPP 200. Interface to communication interface 202 might provide a standard interface between MPP 200 and chip level connections to external modules of network processor 100, for example by one or more ring communication buses. Semaphore Engine (SEM) 222 implements semaphore logic in MPP 200, to manage atomic access to a hardware resource of network processor 100 and MPP 200. For example, for a context thread to utilize an instance of a hardware resource, the context thread might have to reserve a semaphore for that resource. Hash table operations might be carried out by Hash Engine (HE) 220. HE 220 implements hash engine functionality in MPP 200. HE 220 receives instructions from Function Bus Interface (FBI) 216 over function bus 212. State Engine (SENG) 218 might perform functions of a finite state machine (FSM) that operates on received packets. For example, SENG 218 might perform statistics counts and run traffic shaper scripts.

MPP 200 might generally be implemented as a multi-threaded engine capable of executing parallel functions. The multi-threading operation is performed by multiple contexts in MTIE 214. Some embodiments of MPP 200 might employ more than one MTIE 214 to support additional context processing. For example, MPP 200 might preferably include 4 MTIE cores, each capable of processing 32 contexts, for a total of 128 contexts. These contexts might be supported by 256 task identifiers (TIDs), meaning that contexts for up to 256 tasks might be concurrently active in MPP 200.

In accordance with described embodiments, MPP 200 might support ordering of tasks for multiple flows to avoid head-of-line blocking across multiple flows. As will be described, data structures employed by MPP 200 might be scalable for a dynamic number of flows and might not grow as the dynamic number of flows is increased.

Figure 3:
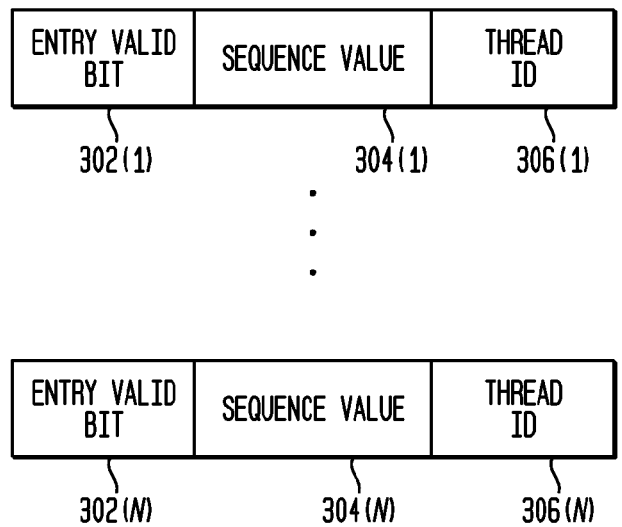
FIG. 3 shows an exemplary block diagram of a thread status table (Oldest Unspecified List, "OUL") employed by the packet processor of FIG. 2 in accordance with exemplary embodiments.

As described in related U.S. patent application Ser. No. 12/974,477 filed on Dec. 21, 2010, described embodiments might employ Oldest Unspecified List ("OUL") 300 shown in FIG. 3. Oldest Unspecified List (OUL) 300 is employed by SCH 204 to track the order in which the thread start (TS) indications were received for each thread. The oldest thread in the list is removed after it has specified its output queue (OQ). OUL 300 is an ordered list of thread identifiers (THIDs) for which SCH 204 has received a TS. The oldest entry is not read from OUL 300 until it has specified its OQ. As shown in FIG. 3, OUL 300 tracks up to N currently active threads. OUL 300 includes valid field 302(1)-302(N) to indicate a valid active thread, sequence value field 304(1)-304(N) to track the sequence number of each thread, and thus thread start order, and thread field 306(1)-306(N) to identify which thread corresponds to the respective entry of thread status table 300.

MPP 200 might maintain a sequence counter that is incremented each time a new thread is allocated. When a thread is allocated, thread status table 300 is updated such that the sequence field (e.g., the corresponding one of 304(1)-304(N)) for the thread is updated with the sequence number. The valid bit (e.g., the corresponding one of 302(1)-302(N)) is set to 1. When the thread is de-allocated, the structure corresponding to the thread is updated. For any thread structure with a sequence value greater or equal to the sequence value of the de-allocated thread, the sequence value is decremented. The valid bit is cleared for the de-allocated thread. The global sequence counter is decremented.

When SCH 204 receives an indication of the start of a thread, SCH 204 records the TS indicator in thread ID field 306 of the corresponding thread in OUL 300. Entries in OUL 300 are written in the order in which the threads are started, and read in the same order. Before, or coincident with when SCH 204 receives the first input packet for a thread, SCH 204 receives an indication of which OQ the thread is to use such as described in related U.S. patent application Ser. No. 12/974, 477 filed on Dec. 21, 2010. While a thread is in OUL 300, OUL 300 might receive input packets. If the thread is not the oldest OUL entry, and the oldest entry has not yet specified its OQ (that is, the valid bit in the QT is still 0), the thread remains in OUL 300. When the oldest thread in OUL 300 has specified its OQ, the thread is moved into a specified one of the OQs such as described in related U.S. patent application Ser. No. 12/974,477 filed on Dec. 21, 2010.

As described, OUL 300 tracks the order in which the threads are received by the scheduler of MPP 200. The oldest thread in the list is removed from OUL 300 after the thread has an OQ specified. OUL 300 tracks thread start order by assigning a sequence number (e.g., sequence value 304 of OUL 300) to each thread, and managing the sequence values of corresponding sequence counters so that (1) when a thread is started/allocated, it is assigned a sequence number one larger than the largest sequence number currently valid in OUL 300 (or 0 if none are valid), and (2) when a thread is deleted/deallocated, all threads with sequence numbers larger than the one being deallocated are decremented by 1.

Figure 4:
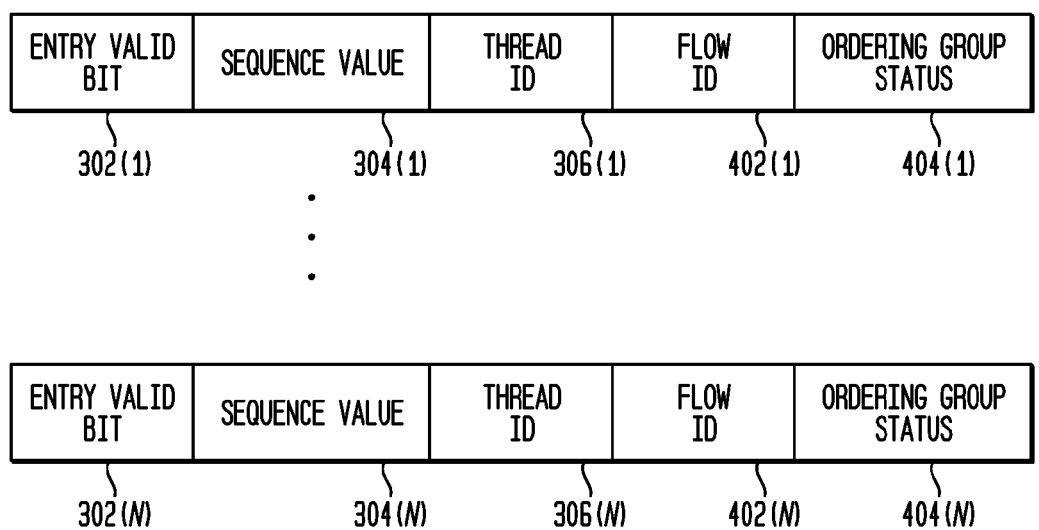
FIG. 4 shows another exemplary block diagram of the OUL employed by the packet processor of FIG. 2 in accordance with exemplary embodiments.

As a result of this management in the OUL embodiment described in related U.S. patent application Ser. No. 12/974, 477 filed on Dec. 21, 2010, the oldest thread is always the thread with a sequence number of 0. This OUL structure might be used in multiple places in MPP 200 (e.g., SCH 204 and FBI 216) to determine the next thread which is allowed to be processed (the oldest). Embodiments described herein offer an enhanced implementation of OUL 300 to expand this structure to include Flow ID field 402 to OUL 300, as shown in FIG. 4. As shown in FIG. 4, OUL 400 includes valid field 302(1)-302(N) to indicate a valid active thread, sequence value field 304(1)-304(N) to track the sequence number of each thread, and thus thread start order, thread field 306(1)-306(N) to identify which thread corresponds to the respective entry of OUL 400, flow ID field 402(1)-402(N) to identify which flow corresponds to the respective entry of OUL 400, and thus allowing OUL 400 to independently track thread start order for multiple flows of MPP 200. OUL 400 also includes ordering group status field 404(1)-404(N), which is described in greater detail regarding FIG. 6.

When a new thread is started, MPP 200 associates a flow ID value with the new thread. The flow ID value is stored in flow ID field 402 of OUL 400 when the OUL entry is made for the new thread. Thus, when threads are allocated or deallocated from OUL 400 (e.g., when a thread is received by MPP 200, or when a thread is assigned an output queue by SCH 204, respectively), sequence numbers might be assigned on a per-flow basis. When a thread is started (allocated) by MPP 200, the thread is assigned a sequence number one larger than the largest sequence number currently valid in OUL 400 (or 0 if none are valid) for the assigned flow ID value. OUL 400 might include up to N counters to track the sequence number for threads in each flow. When a thread is deleted (deallocated), all threads for the same flow having sequence numbers larger than the one being deallocated are decremented by 1. Entries for other flows (and threads for the same flow having sequence numbers smaller than the one being deallocated) are not affected. Thus, the oldest thread in each flow has a sequence number of 0 for each of the N flows. Therefore, described embodiments employ a unique sequence counter per flow such that, when a thread is added to OUL 400, the value of the corresponding sequence counter (before it is incremented) is stored in the corresponding OUL entry as that thread's sequence value. Thus, the information stored as the OUL sequence value is the corresponding counter-per-flow value.

As an example, OUL 400 might appear as shown in the exemplary case shown in table 2 below. In the exemplary case shown in table 2, three (3) threads are active for flow "A" and 4 threads active for flow "B":

TABLE 2

| Thread Number | Valid | Sequence Number | Flow ID |
|---|---|---|---|
| 127 | 0 | x | x |
| 126 | 0 | x | x |
| 125 | 0 | x | x |
| ... | 0 | x | x |
| 63 | 1 | 1 | A |
| 62 | 1 | 1 | B |
| 61 | 1 | 0 | B |
| 60 | 0 | x | x |
| 59 | 1 | 2 | B |
| 58 | 1 | 2 | A |
| 57 | 1 | 3 | B |
| 56 | 0 | x | x |
| 55 | 1 | 0 | A |
| 54 | 0 | x | x |
| ... | 0 | x | x |
| 0 | 0 | x | x |

Thus, as shown in table 2 above, thread 55 is the oldest processing thread for flow "A", and thread 61 is the oldest processing thread for flow "B", while thread 58 is the newest processing thread for flow "A", and thread 57 is the newest processing thread for flow "B". In an alternative embodiment, OUL 400 might employ a linked list structure with additional sets of pointers for each flow ID. Another embodiment might support thread ordering among "A" flows by employing "A" distinct instances of OUL 400.

Further, some embodiments might characterize two or more types of packets for processing (e.g., slow, computing intensive packets and fast, little or no computation traffic). Fast traffic might experience rate degradation if both fast and slow types of traffic are in the same flow. Additionally, without use of flow ID field 402 to track sequence numbers by flow, fast traffic might experience rate degradation even if the two traffic types are in different flows by only tracking a global sequence number (e.g., the oldest thread for any flow could head-of-line block oldest threads for other threads). However, by placing slow traffic in one flow, and fast traffic in a separate flow, and tracking sequence numbers on a per-flow basis, fast traffic is not negatively impacted by slow traffic head-of-line blocking.

Figure 5:
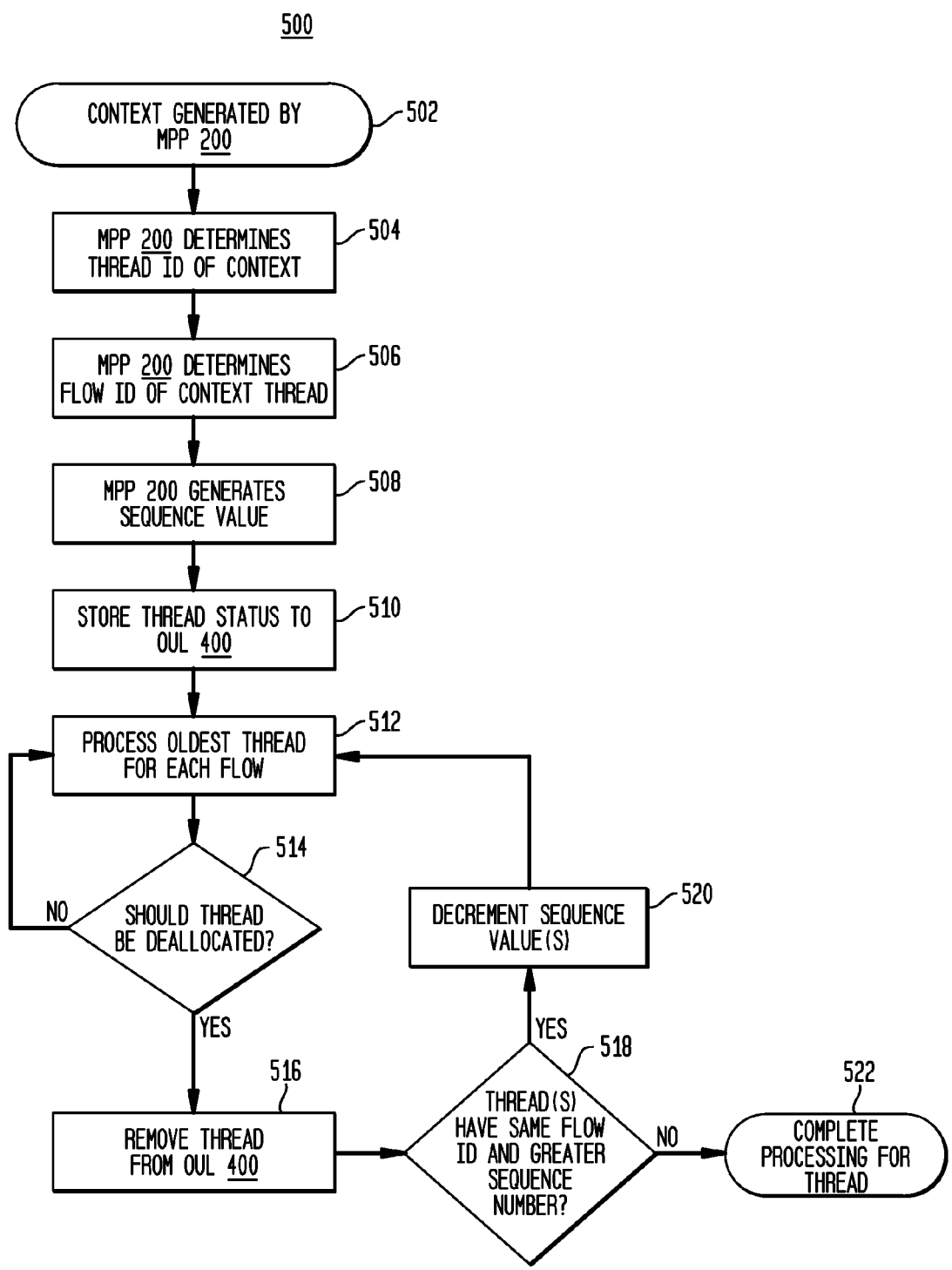
FIG. 5 shows a flow diagram of a thread scheduling process employed by the packet processor of FIG. 2 in accordance with exemplary embodiments.

FIG. 5 shows a flow diagram of thread scheduling process 500. At step 502, a context is generated by MPP 200 corresponding to a data packet received by network processor 100. At step 504, MPP 200 determines a thread ID value associated with the context and, at step 506, determines a flow ID value associated with the context. At step 508, MPP 200 generates a sequence value corresponding to the context on a per-thread, per-flow basis. In described embodiments, the sequence value is based on the determined thread ID value and the determined flow ID value such that the sequence value is based on the on the order in which the contexts are selected within a given flow. At step 510, MPP 200 stores the flow ID value, the thread ID value, the sequence value to an entry in OUL 400 (e.g., entries 304, 306 and 402) and sets corresponding entry valid bit 302. At step 512, the oldest thread for each flow (e.g., the thread having a sequence number of 0 for each flow ID value) is processed by MPP 200 (e.g., by PQM 208).

Within a given flow, the final output order (of PQM 208) is the same as the context/thread start order (e.g., the oldest context of each flow is the first output by PQM 208). In some embodiments, when a thread is started, the thread is added to OUL 400 and also sent to MTIE 214. In an iterative process, the thread might then be sent from SCH 204 to MTIE 214. MTIE might send the thread to FBI 216 to be sent to one or more other submodules of MPP 200 which return the thread to FBI 216 and SCH 204 one or more times, without the thread being removed from OUL 400. In cases where the same thread passes multiple times from SCH 204 to MTIE 214, the oldest context for a given flow might still be getting processed by one of the sub-modules of MPP 200 and the non-oldest contexts might be processed by MPP 200 at the same time as the oldest context. As shown in FIG. 2, SCH 204 has two output paths: one to MTIE 214 that is used each time a context passes through SCH 204 (possibly multiple times for a given context after the context is processed by another submodule of MPP 200); and a second output path to PQM 208 to send output tasks from MPP 200. Contexts sent to MTIE 214 might be sent in any order unrelated to flows or thread start order. Contexts sent to PQM 208 are sent in the context start order for each flow. If a context received by SCH 204 corresponds to a deallocation operation, and the context is the oldest context in its flow (per OUL 400), SCH 204 sends the context to PQM 208 to generate an output task. If the context is not the oldest for the corresponding flow (per OUL 400), then SCH 204 queues the context until the context becomes the oldest in its flow, when the context is sent to PQM 208. A non-oldest context becomes the oldest context as older contexts are deallocated. In this manner, PQM 208 always receives the contexts for a particular flow in the context start order.

At step 514, if a thread should not be deallocated (e.g., processing on the thread is not yet complete), processing on the oldest threads for each flow is performed by MPP 200 at step 512. At step 514, if a thread should be deallocated (e.g., processing on the thread is complete), then process 500 continues to step 516. At step 516, the deallocated thread is removed from OUL 400. At step 518, if any threads have the same flow ID value and sequence numbers larger than the sequence number of the deallocated thread, at step 520 their corresponding sequence numbers are decremented by 1. Process 500 returns to step 512 to continue processing the oldest thread (e.g., having a sequence number of 0) for each flow ID value. At step 518, if any threads do not have the same flow ID value, or have the same flow ID value and sequence numbers less than the sequence number of the deallocated thread, at step 522 the threads for other flow ID values and threads for the same flow ID having sequence numbers less than the one being deallocated are not changed, and thread processing is complete.

As shown in FIG. 4, OUL 400 includes ordering group status field 404(1)-404(N), which is employed to determine a status of the ordering group for the thread. As described in related U.S. patent application Ser. No. 12/976,228 filed Dec. 22, 2010, FBI 216 might provide function calls to a designated module of MPP 200 for execution via function bus 212. Although function bus 212 is shown in FIG. 2 as a single bus, some embodiments might employ more than one function bus 212, based on the type of module that is coupled to each bus. In general, function bus 212 might be employed to communicate between MTIE 214 and HE 220, PIC 210, SEM 222, PQM 208 and SENG 218.

For functions that are defined as ordered, FBI 216 sends out function calls in the order in which the contexts are started, on a per-flow basis, in MPP 200. For functions that are not defined as ordered, FBI 216 might send out function calls in the order they are received, on a global basis, by FBI 216. FBI 216 might typically queue contexts so that generally newer contexts wait for the generally oldest context to be executed. FBI 216 also determines the routing of each function call to a destination module and determines whether the function returns any data upon completion. Additionally, FBI 216 might determine if a function call is a "terminating" function call that ends context processing by MPP 200. As will be described, when FBI 216 detects a context terminating function, FBI 216 updates OUL 400 to mark the thread as finished. When a terminating function call is processed, MPP 200 generates an output task that is communicated, for example, over a ring communication bus to a next module of network processor 100 for subsequent processing after MPP 200.

FBI 216 receives function call requests from MTIE 214 (e.g., to have hash engine 220 perform a hash operation, etc.). FBI 216 decodes each function request to determine an associated thread and associated ordering group. The ordering group index value is assigned to each set of function requests that must be completed in order. FBI 216 might typically support a scalable number of ordering groups. Further, ordering group status values might be able to be checked in a single clock cycle of FBI 216.

For each ordered function request received, FBI 216 checks if the thread associated with the function request is the oldest for the associated flow (e.g., sequence value 304 is equal to 0 for the associated value of flow ID 402). If the thread is not the oldest for the associated flow (e.g., sequence value 304 is not equal to 0 for the associated value of flow ID 402), then FBI 216 checks whether previously received ordered function requests for newer threads have completed. Thus, Flow ID 402 and sequence value 304 are used to identify a next context within the ordering group being processed.

If the thread is the oldest for the flow, FBI 216 sends out the function request to the corresponding module (e.g., one of HE 220, PIC 210, SEM 222, PQM 208 and SENG 218), and the corresponding ordering group status field is set to '1' to indicate the oldest thread for the associated ordering group is finished. If the thread is not the oldest for the flow, FBI 216 checks whether all older threads associated with the ordering group have completed by checking the value of the corresponding order group status field 404 (e.g., order group status equal to '1'). If all older threads are completed, FBI 216 sends out the function request to the corresponding module, otherwise the function request is placed into a pending list to wait for older threads to complete.

When a received function request is sent out by FBI 216, FBI 216 might also send out other function requests from the pending list that can be sent (e.g., based on the Flow ID and sequence values), until there are no more functions that can be sent from the pending list (e.g., they are blocked by older thread(s) in the associated flow).

When the oldest thread for a given flow is completed, FBI 216 unblocks the flow by setting the corresponding ordering group status field 404 in OUL 400 to '1'. FBI 216 checks if all the older threads for the associated ordering group have the corresponding ordering group status field set. FBI 216 also checks whether a next function corresponding to the current thread (e.g., same flow ID and sequence value+1) has function queued in the pending list. If one or more next functions are pending, they are sent by FBI 216 until there are no more functions that can be sent from the pending list (e.g., they are blocked by older thread(s) in the associated flow).

When FBI 216 receives a context terminating function the thread associated with this function is deleted/deallocated. When FBI 216 receives a thread terminating function (e.g., processing for the thread is complete), the ordering group status field for the thread are set to '1'. For other threads having the same Flow ID as the terminated thread and having a sequence value greater than the sequence value of the terminated thread, the sequence values are decremented. FBI 216 also checks whether a next function corresponding to the current thread (e.g., same flow ID and sequence value+1) has function queued in the pending list. If one or more next functions are pending, they are sent by FBI 216 until there are no more functions that can be sent from the pending list (e.g., they are blocked by older thread(s) in the associated flow).

FIG. 6 shows a flow diagram of function scheduling process 600. At step 602, FBI 216 receives a function request from MTIE 214. At step 604, FBI 216 determines a thread ID, a flow ID, and a sequence number corresponding to the received function request (e.g., from OUL 400). At step 606, FBI 216 determines whether the received function request is an ordered request. If the received function request is not ordered, the function is provided to the corresponding processing module (e.g., one of HE 220, PIC 210, SEM 222, PQM 208 and SENG 218) at step 624. If, at step 606, the received function request is ordered, at step 608 FBI 216 assigns a corresponding ordering group value to the function request. At step 610, the ordering group value (and a corresponding ordering group value status) is stored to OUL 400 (e.g., at a corresponding ordering group status field 404). Thus, incoming functions defined as ordered functions are assigned to a corresponding ordering group. FBI 216 determines if the thread associated with the ordering group is the oldest or if ordering group status field 404 is set for all older threads that have not yet been terminated. FBI 216 thus manages ordered functions issued on threads that are not the oldest in a pending list. OUL 400 tracks valid threads, sequence values assigned to threads and thread ordering group status for the threads.

At step 612, if a function request is the oldest thread of a flow, the function is provided to the corresponding processing module (e.g., one of HE 220, PIC 210, SEM 222, PQM 208 and SENG 218) at step 624. Otherwise, at step 614, FBI 216 determines whether ordered function requests for newer threads of the same flow have already completed, which might otherwise unblock the flow. If, at step 614, ordered function requests for newer threads of the same flow have already completed, the function is provided to the corresponding processing module (e.g., one of HE 220, PIC 210, SEM 222, PQM 208 and SENG 218) at step 624. If, at step 614, ordered function requests for newer threads of the same flow have not completed, at step 616, the function is blocked and is queued in a pending list until one or more blocking functions are completed. At step 618, as functions are completed, FBI 216 determines whether completed functions are the oldest thread for a given flow. FBI 216 also might decrement sequence values of other functions similarly as described in regard to FIG. 5 (e.g., steps 518 and 520). If, at step 620, the completed function is the oldest thread for a flow, at step 622, FBI 216 unblocks the flow, and processing returns to step 610 to update the thread status in OUL 400 and to determine subsequent threads to process. If, at step 620, the completed function is not the oldest thread for a flow, the flow remains blocked, and processing returns to step 610 to update the thread status in OUL 400 and to determine subsequent threads to process.

After a function is provided to the corresponding processing module (e.g., one of HE 220, PIC 210, SEM 222, PQM 208 and SENG 218) at step 624, at step 626 the ordering group status field of OUL 400 is updated to reflect a current status of threads in the ordering group. At step 628, FBI 216 checks whether a next function corresponding to the current thread (e.g., same flow ID and sequence counter+1) has function queued in the pending list. If one or more next functions are pending, at step 624 the pending functions are sent by FBI 216 until there are no more functions that can be sent from the pending list (e.g., they are blocked by older thread(s) in the associated flow). Otherwise, at step 628, processing returns to step 616 to update the pending list and wait for blocking functions to complete at step 618.

Thus, as described herein, described embodiments provide a packet classifier for a network processor that generates tasks corresponding to each received packet. The packet classifier includes a scheduler to generate contexts corresponding to tasks received by the packet classifier from a plurality of processing modules of the network processor. The packet classifier processes threads of instructions, each thread of instructions corresponding to a context received from the scheduler, and each thread associated with a data flow. A thread status table has N entries to track up to N active threads. Each status entry includes a valid status indicator, a sequence value, a thread indicator and a flow indicator. A sequence counter generates a sequence value for each data flow of each thread and is incremented when processing of a thread is started, and is decremented when a thread is completed. Instructions are processed in the order in which the threads were started for each data flow.

While the exemplary embodiments have been described with respect to processing blocks in a software program, including possible implementation as a digital signal processor, micro-controller, or general-purpose computer, described embodiments are not so limited. As would be apparent to one skilled in the art, various functions of software might also be implemented as processes of circuits. Such circuits might be employed in, for example, a single integrated circuit, a multi-chip module, a single card, or a multi-card circuit pack.

Described embodiments might also be embodied in the form of methods and apparatuses for practicing those methods. Described embodiments might also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing described embodiments. Described embodiments might can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing described embodiments. When implemented on a general-purpose processor, the program code segments combine with the processor to provide a unique device that operates analogously to specific logic circuits. Described embodiments might also be embodied in the form of a bitstream or other sequence of signal values electrically or optically transmitted through a medium, stored magnetic-field variations in a magnetic recording medium, etc., generated using a method and/or an apparatus of described embodiments.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various described embodiments.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts that have been described and illustrated in order to explain the nature of described embodiments might be made by those skilled in the art without departing from the scope of the following claims.

We claim:

1. A packet classification processor for a network processor having a plurality of processing modules and at least one shared memory, wherein the network processor generates one or more tasks corresponding to each of a plurality of received packets, the packet processor comprising:
a scheduler configured to generate one or more contexts corresponding to tasks received by the packet classification processor from corresponding ones of the plurality of processing modules, each context corresponding to a given flow;
a multi-thread instruction engine configured to process one or more threads of instructions, each thread of instructions corresponding to a context received from the scheduler;
a thread status manager configured to maintain:
(i) a thread status table having N status entries, configured to track up to N active threads, where N is a positive integer, and wherein each status entry corresponds to an active thread, and each status entry comprises a valid status indicator, a sequence value, a thread indicator value, and a flow indicator value, and
(ii) a sequence counter configured to generate a sequence value for each thread of each flow, wherein the sequence counter is incremented each time processing of a thread for a flow is started by the multi-thread instruction engine, and the sequence counter is decremented each time a thread for a flow is completed by the multi-thread instruction engine, whereby a lower relative sequence value indicates an earlier started thread for each flow;
wherein the scheduler is configured to schedule instructions for processing by the packet processor in the order in which the threads were started for each flow, without head-of-line blocking between flows.

2. The apparatus of claim 1, wherein the scheduler is further configured to:
provide instructions to a function bus interface of the packet processor, the function bus interface configured to provide the instructions for processing by one or more sub-modules of the packet processor, the one or more sub-modules of the packet processor configured to return processed instructions to the scheduler via the function bus interface, wherein the scheduler is configured to schedule instructions for processing by the packet processor in the order in which the instructions are received from the function bus interface.

3. The apparatus of claim 1, wherein the scheduler is further configured to:
perform a thread allocate operation to the multi-thread instruction engine;
wherein, for the thread allocate operation, the scheduler is further configured to (i) issue a context to the multi-thread instruction engine, (ii) set the valid status indicator in the thread status table, (iii) set the corresponding sequence value to the incremented sequence counter value for the flow, (iv) set the corresponding thread indicator to the corresponding thread identifier, (v) set the corresponding flow indicator to the corresponding flow identifier, and (vi) increment the sequence counter for the flow associated with the allocated thread.

4. The apparatus of claim 1, wherein the scheduler is further configured to:
perform a thread deallocate operation from the multi-thread instruction engine;
wherein, for the thread deallocate operation, the scheduler is further configured to (i) clear the corresponding valid status indicator, (ii) decrement the sequence counter for the flow associated with the deallocated thread, and (iii) decrement the corresponding sequence value for thread status table entries having the same flow indicator value and sequence values greater than the sequence value of the deallocated thread.

5. The apparatus of claim 1, wherein each status entry further comprises an ordering group status, and wherein a function manager of the packet processor is configured to:
receive function requests from the multi-thread instruction engine, wherein each function requests corresponds to a thread and flow of the multi-thread instruction engine;
determine whether a received function request is an ordered function request, wherein an ordered function request corresponds to a ordering group of functions that are required to be performed in a given order; and
based on the determination, select one or more function requests for each flow for transmission to an associated processing sub-module of the packet processor.

6. The apparatus of claim 5, wherein, if the function request is an ordered function request:
the function manager is configured to:
determine an ordering group associated with the function request;
store an ordering group status to the corresponding status entry of the thread status table;

provide one or more function requests corresponding to an oldest thread for each flow for transmission to an associated processing sub-module of the packet processor.

7. The apparatus of claim 6, wherein if the function request does not correspond to the oldest thread for a flow:
if one or more ordered function requests for newer threads are complete, provide the function request for transmission to an associated processing sub-module of the packet processor;
otherwise, placing the function in a pending list until one or more previous functions complete.

8. The apparatus of claim 5, wherein, if the function request is not an ordered function request:
the function manager is configured to provide the received function request to an associated processing sub-module of the packet processor without blocking.

9. The apparatus of claim 5, wherein the processing sub-modules of the packet processor comprise one or more of:
a packet modifier configured to modify packet data before the packet is scheduled for transmission from the network processor;
a packet integrity checker configured to perform error checking and determine whether a packet is properly formed according to a given protocol;
a semaphore engine configured to manage atomic access to memory of the network processor;
a hash engine configured to perform hash operations of the packet processor; and
a state engine configured to perform functions of a finite state machine on received packets.

10. The apparatus of claim 5, wherein the function manager is configured to check the ordering group status in a single clock cycle.

11. The apparatus of claim 1, wherein the thread indicator value of an oldest thread of each flow of the thread status table has a corresponding sequence value equal to 0 for each flow.

12. A method of classifying packets received by a network processor having a plurality of processing modules and at least one shared system memory, the method comprising:
generating, by at least one of the plurality of processing modules, one or more tasks corresponding to each of a plurality of received packets;
generating, by a scheduler, one or more contexts corresponding to tasks received by the packet classification processor from corresponding ones of the plurality of processing modules, each context corresponding to a given flow;
processing, by a multi-thread instruction engine, one or more threads of instructions, each thread of instructions corresponding to a context received from the scheduler;
maintaining, by a thread status manager, (i) a thread status table having N status entries, where N is a positive integer, and (ii) a sequence counter for each flow;
tracking, by the thread status table, up to N active threads, wherein each status entry corresponds to an active thread, and each status entry comprises a valid status indicator, a sequence value, a thread indicator value, and a flow indicator value,
generating, by each sequence counter, a sequence value for each thread by the steps of:
incrementing the sequence counter each time processing of a thread for the associated flow is started by the multi-thread instruction engine, and
decrementing the sequence counter each time a thread for the associated flow is completed by the multi-thread instruction engine, whereby a lower relative sequence value indicates an earlier started thread for the flow; and
scheduling, by the scheduler, instructions for processing by the packet processor in the order in which the threads were started for each flow, without head-of-line blocking between flows.

13. The method of claim 12, further comprising the steps of:
providing, by the scheduler, instructions to a function bus interface of the packet processor;
providing, by the function bus interface, the instructions for processing by one or more sub-modules of the packet processor;
processing the instructions by the corresponding one or more sub-modules;
returning, by the corresponding one or more sub-modules, processed instructions to the scheduler via the function bus interface; and
scheduling, by the scheduler, instructions for processing by the packet processor in the order in which the instructions are received from the function bus interface.

14. The method of claim 12, further comprising the steps of:
allocating, by the scheduler, a corresponding one of the one or more threads for each flow to the multi-thread instruction engine for processing; and
deallocating, by the scheduler, a corresponding one of the one or more threads for each flow from the multi-thread instruction engine upon the multi-thread instruction engine completing the corresponding thread.

15. The method recited in claim 14, wherein the step of allocating a thread comprises the steps of:
(i) issuing a context to the multi-thread instruction engine;
(ii) incrementing the sequence counter for the flow associated with the allocated thread; and
(iii) setting the corresponding status entry in the thread status table by the steps of:
setting the corresponding valid status indicator;
setting the corresponding sequence value to the incremented sequence counter value for the flow; and setting the corresponding thread indicator to a corresponding thread identifier;
and wherein the step of deallocating a thread comprises the steps of:
(i) clearing the corresponding valid status indicator;
(ii) decrementing the sequence counter for the flow associated with the deallocated thread; and
(iii) decrementing the corresponding sequence value for thread status table entries having the same flow indicator value and sequence values greater than the sequence value of the deallocated thread.

16. The method of claim 12, wherein each status entry further comprises an ordering group status, and wherein the method further comprises:
by a function manager of the packet processor:
receiving function requests from the multi-thread instruction engine, wherein each function requests corresponds to a thread and flow of the multi-thread instruction engine;
determining whether a received function request is an ordered function request, wherein an ordered function request corresponds to a ordering group of functions that are required to be performed in a given order; and
based on the determination, transmitting one or more function requests for each flow to an associated processing sub-module of the packet processor.

17. The method of claim 16, wherein, if the function request is an ordered function request, the method further comprises:
- determining a ordering group associated with the function request;
- storing an ordering group status to the corresponding status entry of the thread status table; and
- transmitting one or more function requests corresponding to an oldest thread for each flow to an associated processing sub-module of the packet processor.

18. The method of claim 17, wherein if the function request does not correspond to the oldest thread for a flow, the method further comprises:
- if one or more ordered function requests for newer threads are complete, providing the function request for transmission to an associated processing sub-module of the packet processor;
- otherwise, placing the function in a pending list until one or more previous functions complete.

19. The method of claim 16, wherein, if the function request is not an ordered function request, the method further comprising:
- providing the received function request to an associated processing sub-module of the packet processor without blocking.

20. The method of claim 12, further comprising:
- providing, by the thread status manager to the scheduler, the oldest thread for each flow of the thread status table, wherein the oldest thread has a corresponding sequence value equal to 0 for each flow.

* * * * *